United States Patent [19]
Moss, Jr. et al.

[11] 3,710,310
[45] Jan. 9, 1973

[54] SYSTEM FOR DETERMINING DEPTH OF WATER

[75] Inventors: George J. Moss, Jr., Bethesda, Md.; George M. Walsh, Middletown, R.I.

[73] Assignee: The United States of America as represented by the Secretary of the Navy

[22] Filed: Dec. 23, 1970

[21] Appl. No.: 100,932

[52] U.S. Cl. ............................340/3 R, 343/100 CL
[51] Int. Cl. ................................................G01s 9/68
[58] Field of Search ..........340/1 C, 3 R; 343/100 CL

[56] References Cited

UNITED STATES PATENTS

| | | | |
|---|---|---|---|
| 3,158,830 | 11/1964 | Clay, Jr. | 340/3 R |
| 2,907,400 | 10/1959 | Swafford, Jr. | 343/100 CL |
| 3,307,143 | 2/1967 | Wyse et al. | 340/3 R |

*Primary Examiner*—Richard A. Farley
*Attorney*—R. S. Sciascia, Arthur L. Branning and M. L. Crane

[57] ABSTRACT

This disclosure is directed to a system for surveying ocean or inland water to obtain depth or slant range information without recording false signals. The system makes use of a single generator that generates a signal which starts a counter and is transmitted into the water. A portion of the generated signal is directed into the delay circuit which delays the signal that controls a gate through which the return signal is processed. The return signal is passed through an automatic gain control and the gate which is controlled by the delayed signal. The delay is sufficient to prevent processing of any false signals. The return signal that passes through the gate is detected and stops the counter which was started upon initiation of the generated signal. The counter output is directed to a digital recorder which indicates a measure of distance in accordance with the amount of time the counter was operational.

3 Claims, 2 Drawing Figures

PATENTED JAN 9 1973 3,710,310

INVENTORS
GEORGE J. MOSS, JR.
GEORGE M. WALSH
BY
ATTORNEY

SYSTEM FOR DETERMINING DEPTH OF WATER

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

This invention relates to the measurement of distances for determining the depth of water and more particular to a system for measuring distance without measuring substantial false signals.

Heretofore, digital depth sounding has been carried out by the use of short pulses of sound transmitted into the water and a counter indicated by the transmission of the short pulse of sound. The counter counts timing pulses from an internal source until an acoustic echo is received from the ocean bottom at which time an appropriate mechanism causes the counter to stop. The counter contents, which represent the round trip time for the acoustic pulse, are recorded in digital form. To reduce noise, conventional digital depth sounders employ a gating mechanism which permits the counter to be stopped only by echoes which arrive within a narrow time window centered on the expected echo arrival time. This time window rejects extraneous noise pulses which do not occur in the immediate vicinity of the expected echo arrival time. In use of such systems, it is necessary to start the center of the time window at a point sufficiently close to the water depth to make the echo arrive within the specific time window. Digital depth readings cannot be made in a time frame outside of the designated time window. Consequently, the operator must refer to an analog depth readout prior to starting the digital system, or resort to trial-and-error procedures. Also, conventional digital depth sounders lose track of the bottom being measured if signals fade when the depth changes rapidly, so that the echo is outside the time window when signal strength is restored. This effect is especially severe because steep bottom slopes tend to reduce reflected signal strength by reflecting sound energy away from the receiving hydrophone. Therefore, it is important to an operation of prior art digital depth sounding systems to have a reasonable knowledge of the depth being measured.

SUMMARY OF THE INVENTION

The system set forth by this invention obtains depths of water of regular or irregular bottom surfaces by use of a signal delay control in combination with a threshold detector which does not permit false signals or noise to pass through the system to be detected. The delay is adjusted to prevent passage of the return signals until after a specific time and the threshold detector limits the output signals to those signals that have at least a specific signal strength level. Therefore, the signals that are processed through the system to stop a time counter, which represents a measure of the distance, will normally be those reflected back by the bottom and which are of high strength.

STATEMENT OF THE OBJECTS

It is therefore an object of the present invention to provide a system which reduces the false alarm probabilities of digital depth sounders.

Another object is to provide a system which determines the depth of irregular as well as regular bottom surfaces of ocean or inland waters.

Still another object is to provide a system for reliably determining bottom contours through elimination of narrow time windows.

Yet another object is to provide a system which is simple in operation and may be operated by unskilled as well as skilled operators.

Other and more specific objects of this invention will become apparent upon a more careful consideration of the following detailed description when taken together with the accompanying drawing.

DESCRIPTION OF THE INVENTION

Figure 1:
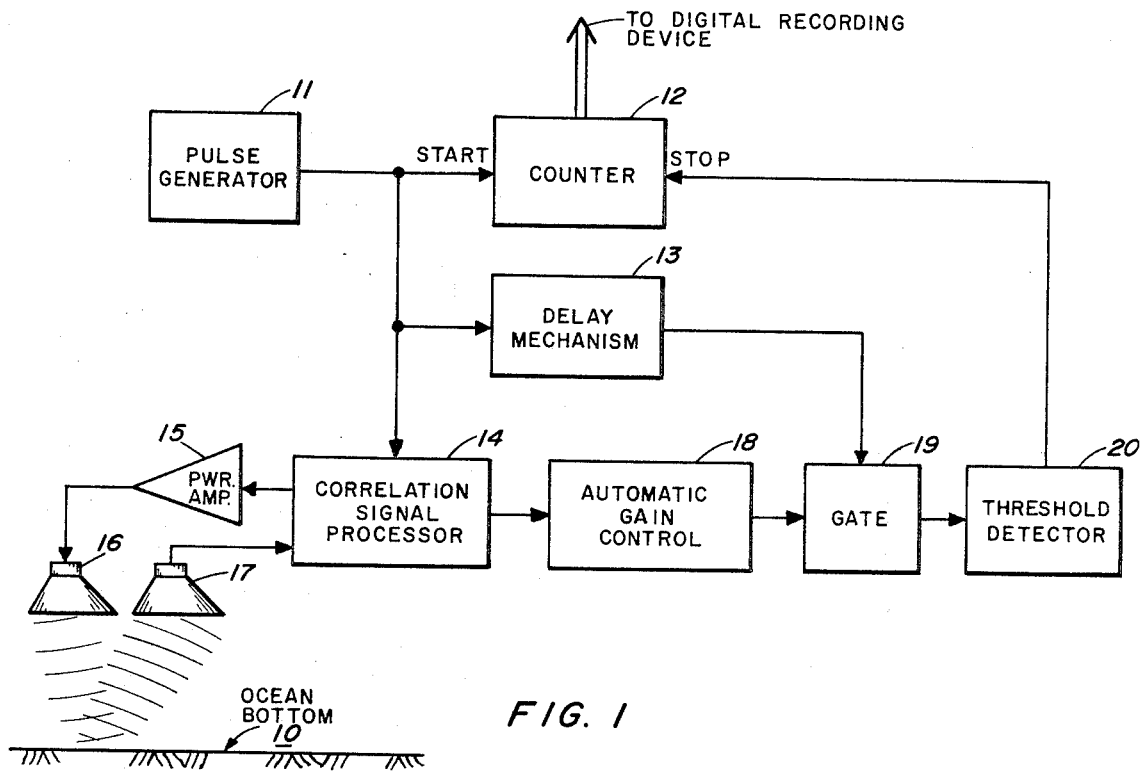
FIG. 1 is a block diagram of the system made in accordance with the teaching of this invention.

The system as shown by FIG. 1 includes a pulse generator 11 which simultaneously directs a signal into a counter 12, a delay mechanism 13 and into a correlation signal processor 14. The correlation signal processor 14 is triggered by the signal pulse from the pulse generator and the correlation signal processor generates a reference waveform which is amplified by a power amplifier 15 and transmitted into the water by any suitable projector or transducer 16. The signal is reflected back by the waters bottom 10 and the reflected signal is received by a suitable transducer or hydrophone 17. The signal from the hydrophone 17 is directed into the correlation signal processor 14 which generates an output signal which is directed to an automatic gain control circuit (A.G.C.) 18. The output signal from the correlation signal processor 14 is equal to the cross correlation function of the received signal and the reference waveform. The automatic gain control circuit 18 adjust its gain so as to produce a constant output noise level. The output from the automatic gain control is directed into a gate 19. A signal from the delay mechanism 13 is also directed into the gate 19 which enables the gate 19 a predetermined time after signal transmission. Therefore, any signals caused by sound reflections from fish or other scatterers will be blocked by the gate 19 prior to the signal received from the delay mechanism. When gate 19 is enabled, the signal from the automatic gain control circuit reaches a threshold detector 20. The threshold detector 20 is set at a pre-set threshold such that if the amplitude of the signal exceeds the pre-set threshold, a pulse is generated which is directed to stop the counter 12. The counter 12 counts internally-generated timing pulses between receipt of a start pulse from the pulse generator 11 and a stop pulse from the threshold detector 20. The final contents from the counter represents round-trip acoustic travel time to the bottom plus the duration of the transmitted signal. This number is recorded in digital format by any suitable recording device for computer analysis or any other analysis at a later time. The recorder is not shown for simplification of the drawing.

In operation of the device, the delay mechanism 13 is set such that the signal generated by the pulse generator will be delayed a time sufficient for the signal to return from the most shallow water anticipated to be measure. The threshold detector 20 is set at a threshold which is just below the signal level which is adequate to stop the counter 12. All circuits and elements of the system are made operational. Operation for depth measurement is initiated by a pulse generated by the pulse generator 11. This pulse starts the time counter 12 and a signal is directed into the delay mechanism 13 which delays the signal to gate 19 to an adjusted time period which is sufficient to permit the pulse signal to be directed to the bottom of the water and back to the gate 19. Simultaneously, the generated pulse signal triggers the correlation signal processor 14. Upon being triggered, the correlation signal processor 14 generates a reference waveform which is amplified by the power amplifier 15 which directs the reference waveform to the transmitter projector 16. The sound wave signal is reflected back by the bottom surface and is received by the hydrophone 17 which generates a corresponding electrical signal. The signal from the hydrophone 17 is directed into the correlation signal processor 14 which generates an output signal to the automatic gain control circuit 18 which is equal to the cross correlation function of the received signal and the reference waveform. The automatic gain control circuit 18 adjusts its gain so as to produce a constant output noise level. The output from the automatic gain control is directed to the gate 19. If the signal from the delay mechanism has been directed to the gate 19 by the delay mechanism, the signal received form the automatic gain control enables the gate 19 to permit passage of the signal from the A.G.C. to the threshold detector 20. If the amplitude of the signal received by the threshold detector is greater than that at which the threshold detector has been set, a pulse is generated which is directed to the counter 12 in order to stop the counter. During the time period between the initiation of the counter by the pulse generator and stoppage of the counter by the signal from the threshold detector, the counter counts internally-generated time pulses which are directed to a suitable recording device. The counts produced by the counter represent round-trip acoustic travel time to the bottom, plus the duration of the transmitted signal, from which a measure of the distance from the transducer to the bottom of the water is ascertained.

As set forth above, the delay mechanism 13 produces a voltage step which enables the gate 19 a predetermined time after signal transmission. For water depth greater than 400 fathoms, the delay mechanism will typically be set for one second, so that signals caused by sound reflections from fish or other elements in the water will be blocked by the gate 19. However, operation in shallower depths will require correspondingly smaller delay times.

Figure 2:
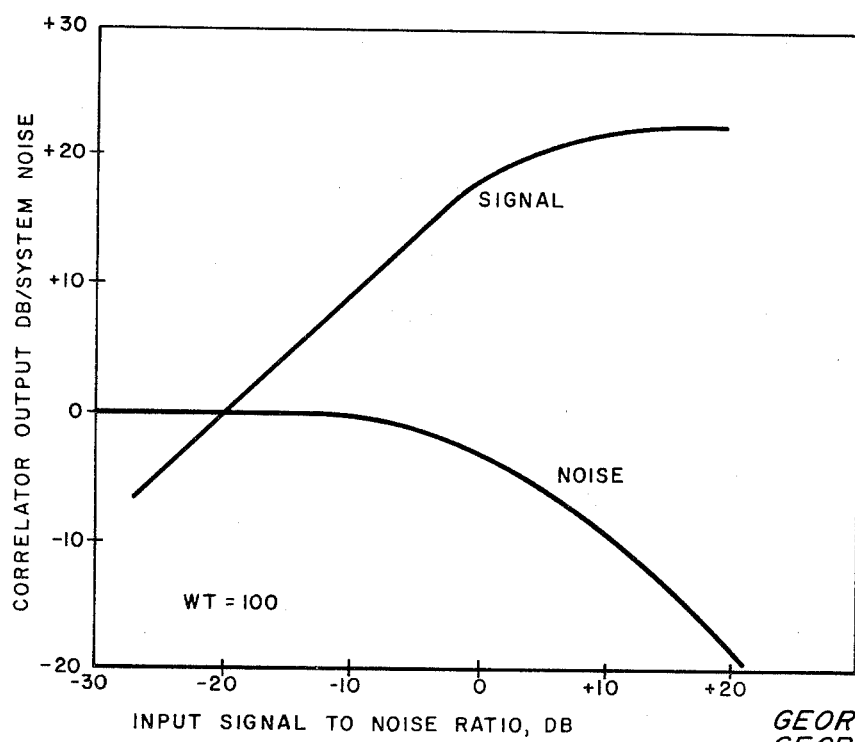
FIG. 2 illustrates curves that represent an input signal to noise ratio relative to the output level of the cross correlation waveform.

The correlation signal processor 14, the automatic gain control circuit 18, and the threshold detector 20 work together to reject extraneous noise pulses which do not occur at the time of the actual echo arrival, to within ± the transmitted pulse duration. This can be understood by referring to FIG. 2, which represents the performance parameters of the correlation signal processor 14 (assuming correlation based on polarity only, and a time-bandwidth product of 100). The abscissa represents the input signal-to-noise ratio, and the ordinate represents the output level of the cross-correlation waveform. The ordinate is referenced to the noise generated by the correlation signal processor in the absence of a signal, so that a signal which is equal in amplitude to the steady-state background noise level has a level of 0 db. The output signal level increases with increasing input signal-to-noise because the instantaneous polarity of the cleaner signals are sampled with greater fidelity in the correlation signal processor; thus, the sampled signal more nearly represents the reference waveform, and the cross-correlation product is greater. Also the noise generated by the correlation processor 14 decreases with increasing input signal-to-noise, because the presence of a signal reduces the influence of input noise on the polarity of the sampled signal. As a result, the correlator output noise starts to decrease when the full waveform has been received, and returns to its original level as random noise purges the correlation processor's memory of the echo waveform. Thus, the output noise level reaches a minimum at the instant that the cross-correlation produce reaches its peak. The significance of this is that a sudden decrease in the output background noise level gives advance warning that an echo pulse is coming. This decrease in the background noise level occurs if input signal-to-noise is sufficiently high.

When the output noise level of the correlation signal processor 14 decreased, in anticipation of an echo, the automatic gain control circuit 18 increases its gain sufficiently to keep the noise level at the input of gate 19 at a constant level. In so doing, it boosts the level of the actual signal to a level significantly higher than that indicated by FIG. 2. For example, if the input signal-to-noise is +5 db, the automatic gain control 18 will boost the gain by 5 db to compensate for the decrease of the noise level indicated by FIG. 2. This will result in an output signal level of +25 db, as opposed to the 20 db indicated by FIG. 2. If the threshold detector 20 is set at 24 db, the aforementioned 25 db signal level will be adequate to stop the counter.

The time constant of the automatic gain control 18 must be short enough to follow the decrease in noise level, yet long enough to average out several cycles of random noise. Thus, it must be short compared to the transmitted signal duration, and long compared to the reciprocal of the signal bandwidth. For a signal bandwidth of 2,000 hertz and a transmitted pulse duration of 50 milliseconds, a time constant in the vicinity of 10 milliseconds is appropriate.

In the absence of a signal, the automatic gain control circuit 18 has a nominal gain of unity. Under this condition the maximum instantaneous level at its output terminals will be +23 db, the signal saturation level indicated by FIG. 2. This is an upper bound only, since such a high instantaneous level is highly improbable in the absence of an input signal. Thus, no instantaneous incoherent noise pulse can stop the counter, unless it occurs within one transmitted signal duration of the actual echo arrival time. The existence of an absolute maximum signal output level is an inherent property of the correlator due to the signal quantization.

The net effect of the above is that no signal or noise impulse can stop the counter unless it is preceded by the background noise reduction associated with the presence of an actual signal. This contrasts with the behavior of the time windows of convential digital sounders, which reject extraneous noise pulses which do not occur in the immediate vicinity of the expected echo arrival time. The invention is similar to conventional digital depth sounders in the sense that it rejects extraneous noise pulses which do not occur during a limited time window. The invention differs from conventional digital depth sounders in the sense that the time window is based on the current echo, rather than on an expected echo-arrival time. Thus, the invention is not subject to loss-of-track resulting from discrepancies between the actual and expected echo-arrival times.

The detection threshold of the invention is approximately +5 db, based on the numbers cited above. This means the sonar parameters such as transmitted frequency, power, transducer beam-width, etc., must be such as to insure a signal-to-noise ratio of at least +5 db at the input terminals of the correlation processor, in order to insure the type of operation described above.

In many applications it will be desirable to obtain an analog record of the ocean depth, in addition to a digital record. Accordingly, the pulse generator 11 can be replaced with the synchronization pulse generator which is a part of the line-scan recorders which are commonly used for this purpose; signal input for the line-scan recorder can be taken from the output of the correlation signal processor 14, the output of the automatic gain control 18, or from the output of the gate 19. Synchronization circuits can be included in the counter 12 or in the correlation signal processor 14 to subtract pulse duration from the counter contents, so that final counter contents represent depth rather than depth plus transmitted pulse duration. The delay mechanism 13 can be manually adjustable, or can be linked to the counter 13 by digital logic in such a way that the delay time decreases automatically as depth of the water decreases below 400 fathoms. A transmit-receive switch can be interfaced to the power amplifier 15 and the correlation signal processor 14 in such a manner as to permit the use of a single transducer, as opposed to a separate projector 16 and hydrophone 17.

A decrease in noise level is a detection criterior which brings about an improved false-alarm probability and the elimination of narrow time windows provides a capability of tracking a rough bottom. These factors are brought about by a system which is simple in operation and yet has a capability of generating continuous reliable digital depth profiles with little attention by an operator.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A system for determining depth of water, which comprises;
   a signal generator for generating electrical pulses,
   a counter,
   a delay means,
   a correlation signal processor,
   said counter, said delay means and said correlation signal processor so arranged for simultaneously receiving signals from said signal generator,
   an amplifier for receiving and amplifying an output from said correlation signal processor,
   means for receiving a signal from said amplifier and directing an acoustical signal into a water surrounding,
   means for receiving sound waves reflected back and converting sound waves to an electrical signal and directing the electrical signal into said correlation signal processor,
   an automatic gain control so arranged to receive a signal output from said correlation signal processor,
   a gate means,
   said gate means so arranged to receive a signal from said delay means and said automatic gain control,
   a threshold detector,
   said threshold detector so arranged to receive a signal from said gate means and to direct a signal to said counter to stop said counter, and
   means for recording timing pulses generated by said counter,
   whereby depth is determined by the number of timing pulses generated by said counter during operation thereof.

2. A system as claimed in claim 1, wherein;
   said delay means is adjustable to control the time of delaying a signal from said signal generator to said gate means.

3. A method of determining the depth of a body of water which comprises,
   setting the delay time of a delay means,
   setting the threshold of a threshold detector,
   generating a first electrical signal,
   directing said signal to start operation of a counter, simultaneously directing said electrical signal into said delay means and into a correlation signal processor,
   generating a reference waveform output in said correlation signal,
   amplifying said reference waveform and transmitting an acoustic signal into the water corresponding to said reference waveform,
   receiving acoustical waves reflected back and converting said acoustical waves into a corresponding second electrical signal,
   directing said second electrical signal into said correlation signal processor to generate an output signal equal to the cross correlation function of the second electrical signal and said reference waveform and directing the output signal to an automatic gain control circuit,
   directing an output signal from said automatic gain control circuit to a gate means,
   directing a signal from said delay means to said gate means,
   directing a signal from said gate means to said threshold detector,
   whereby a signal having a threshold greater than the setting of said threshold detector is directed to said counter to stop said counter.

* * * * *